United States Patent [19]
Condon et al.

[11] Patent Number: 5,323,642
[45] Date of Patent: Jun. 28, 1994

[54] NON-INVASIVE TESTING APPARATUS FOR SUBMERSIBLE TIMEPIECES

[76] Inventors: Todd Condon, 256 Crescent Ave., Port St. Lucie, Fla. 34984; David Fang, 2065 SW. Olympic Club Terr., Palm City, Fla. 34990

[21] Appl. No.: 9,046

[22] Filed: Jan. 26, 1993

[51] Int. Cl.⁵ .............................................. G01M 3/32
[52] U.S. Cl. .......................................... 73/49.3; 73/37
[58] Field of Search ...................... 73/40, 37, 49.3, 52, 73/45.5

[56] References Cited

U.S. PATENT DOCUMENTS 3,355,932  12/1967  Mulligan ............................ 73/49.3

FOREIGN PATENT DOCUMENTS

| | | | |
|---|---|---|---|
| 2458137 | 6/1976 | Fed. Rep. of Germany | 73/49.3 |
| 208573 | 2/1940 | Switzerland | 73/40 |
| 302970 | 11/1954 | Switzerland | 73/40 |
| 1469372 | 3/1989 | U.S.S.R. | 73/49.3 |
| 1384164 | 2/1975 | United Kingdom | 73/40 |

*Primary Examiner*—Hezron E. Williams
*Assistant Examiner*—Joseph W. Roskos
*Attorney, Agent, or Firm*—Carl Fissell, Jr.

[57] ABSTRACT

Non-invasive, portable, modular testing apparatus for non-invasively testing timepieces for fluid integrity without damaging or dismantling the timepiece and without interrupting the timekeeping function or operation thereof, including a transparent tubular container member capable of providing a high pressure, fluid sealed environment for the timepiece, the container member being open at one end and provided with an enlarged, integral rim portion, the opposite integral end of the tubular container member including an enlarged integral rim portion equal in diameter to the rim portion of the open end providing a rigid, non rockable base for the container, a circular, rigid, transparent closure member for the container securing the closure member to the tubular container member, and a pressure applicator integral with the tubular container member, for automatically pressurizing the internal volume of the tubular container member.

11 Claims, 6 Drawing Sheets

NON-INVASIVE TESTING APPARATUS FOR SUBMERSIBLE TIMEPIECES

BACKGROUND OF THE INVENTION

1. Field of the Invention

The present invention relates broadly to apparatus for the non-invasive testing of underwater timepieces used by SCUBA divers and the like. These timepieces are acquired by the diver with disclosed depth/water pressure resistance limits indicated to the diver by the manufacturer. After watch battery replacement or necessary repair, it is essential for continued safe use and watch movement protection to ensure the original claim of water resistance. This novel invention accomplishes this requirement quickly and efficiently without timepiece disassembly or dangerous movement exposure to water by simple and direct observation.

2. Description of the Prior Art

Testing sealed devices and apparatus for possible leakage of fluids or gases into or out of such apparatus is old and well known in the art. Some apparatus use the pressure difference between the device to be tested and that of the fluid or liquid into which the device is immersed to immediately produce tell-tale bubbles which are visually apparent to the individual observer performing the test. A variety of such testing devices and others are disclosed in the following patents:

U.S. Pat. No. 2,055,568 describes a relatively cumbersome and complex structure in which a watch to be tested is suspended, totally immersed, in a liquid within a transparent receptacle. Means is provided to create a vacuum in the receptacle above the liquid level such that any leakage of air from the watch would create bubbles which may be observed by the test operator. This structural arrangement and testing method continuously and dangerously exposes the watch to possible liquid invasion throughout the test, as well as the possible filling of the watch case with liquid as a result of the vacuum employed with the test. In addition, the test apparatus does not provide a simple and easy method for quickly removing the watch case from the liquid (in case of a faulty seal) to avoid destruction of the movement by the liquid. Obviously, this is not a completely safe procedure for use with delicate and complex watch movements.

U.S. Pat. No. 3,517,547 describes a two stage or two step type watch testing procedure wherein the watch to be tested first has its crown removed after which a structural bore is fitted around the watch stem tube. The watch is then pressurized by a hand pump and any escape of air is noted by movement of the pressure pump. The watch is then immersed in a testing liquid, for example, water or water and alcohol mixed, and visibly checked for the formation and/or escape of air bubbles due to possible leaks in the case or stem of the watch. This apparatus is not a completely sealed member but relies on an integral, attached pressure pump for pressurizing the interior of the watch through the stem tube of the watch after removal of the crown from the watch. First, the complex design variances of lock down crowns, screw down crowns and stem/crown guards requires an extensive bore assembly or an extremely large set of nozzles in order to be able to test all types and styles of the growing sport watch market. This is very expensive and not efficient time-wise. Second, the test is self defeating since reassembly of the watch crown is required, thus negating the purpose of the test. U.S. Pat. No. 3,991,622 describes a complex and very sophisticated electromagnetic/electromechanical strain detection apparatus for detection of strain occurring at the surface of the object in a test container when subjected to a varied pressure. Although this structural arrangement is illustrated and described as used for testing wrist watches, it would appear to be ultra complex, obviously delicate and much too expensive and difficult to use for the average .proprietor of a watch or jewelry shop or even for a proprietor which deals in SCUBA diving timepieces. Also, supposing a leak to be discovered, there is no indication of its location.

U.S. Pat. No. 3,355,932 relates to apparatus for gas pressure testing of watches and requires two different container vessels (one is a test tank and the other is a comparator tank) and two different watches plus assorted valves and a pressure gauge for pressure indication and control. Air is first pumped into the test container by means of a small hand pump. A series of time-consuming tests are then required and performed. In one test, disassembly of the watch under test is also required, which makes the test self-defeating.

Patent DT 2,815,394 relates to a testing chamber for watches in which a watch to be tested is first covered completely with a plastic coating. The pressure in the test chamber of the test device is reduced to a given value creating a pressure differential between the interior of the watch case and the interior of the test chamber. This difference in pressure will cause a bubble of air to form in the plastic coating at the site of any air leak in the device being tested.

Patent 209,379 (Switzerland) illustrates and describes a transparent container in which a watch is suspended immersed in a liquid, for example, water. A threaded hand turned screw applies pressure to the contents until air bubbles appear around the watch case. The apparatus is complex and awkward to use and appears to suffer from the obvious requirement of hand manipulation.

SUMMARY OF THE INVENTION

None of these prior art devices or apparatus of relevance are of the non invasive type. In other words, most of the apparatus described hereinabove requires some invasive/disassembly procedure with respect to the timepiece in which either the watch case is removed from the mechanism or the watch stem is removed, or the complete watch mechanism is dismounted from the case. In some instances the case is pressure tested with the watch mechanism removed from its case. The watch mechanism is then remounted in the case and the complete watch assembly is retested. Some of the procedures involved in the prior art permit the watch to remain submerged for varied periods of time so as to view the escaping air bubbles, if any, after which .the watch must be reinspected for residual water or moisture.

All of the known prior art apparatuses are complex and expensive to buy or build. Some of these pieces of apparatus require the use of chemical compounds not readily obtainable on the open market. Some of the described apparatus requires more than average skill and knowledge with respect to air and water pressure vis-a-vis small containers. Valving, tubing and pumps can be unwieldy to use and not at all easy to fabricate and handle.

Many of the devices of the prior art are not easily and readily usable in a confined space such as a jewelry counter top. Valves, connection pressure gauges and the like are easily misused due to the inexperience of the operator and are thus not always failsafe, mechanically trustworthy or reliable with respect to their input-output indications vis-a-vis pressure. Some prior art testing devices employ specialized parts, the failure of any one of which could pose a serious, time consuming problem insofar as ease of replacement or repair is concerned. Also, more importantly, none of the testing device apparatuses hereinbefore described mention nor could they provide a sufficiently high pressure level to be of real benefit to the claim of water resistency of sport watches. More specifically, none of the apparatus provide a concrete test result, e.g., the watch has been water pressure tested to the equal of 220 feet deep. A pressure depth chart is set forth hereinafter for comparison purposes.

The present invention solves these and other associated problems with a new, novel and not heretofore available noninvasive timepiece testing apparatus.

The present invention comprises a self-contained, completely transparent (interior easily observed), portable, molded, cylindrical, two piece member having an integral bottom end and an open top end including a transparent molded top cover. The top and bottom of the cylindrical member include a circular lip or rim extending slightly outwardly from the side wall of the cylindrical member. The bottom rim or lip is provided with integral molded standoff members forming supporting feet. The top lip or rim includes a plurality of mounting or securing holes extending therethrough. The top cover member includes a plurality of similar mounting or securing holes for reception therethrough of individual clamping bolts and wing nuts. A deformable, resilient, gasket of rubber or neoprene is disposed within a channel or groove in the upper or top lip or rim and is interposed between the top cover and the top lip or rim providing an effective seal when the lid or cover is tightened onto the top rim of the cylindrical member. The entire cylindrical member, when sealed, creates a testing environment capable of containing an internal atmosphere in excess of 110 psi. A supporting hanger shaped to fit a watch bracelet is secured to the cover lid for mounting a timepiece within the cylindrical member when the lid is closed and tightened onto the top.

Integrally molded into the side wall of the cylindrical member is a pressure applying member. The pressure applying member comprises an angularly, downwardly canted, short cylindrical member, open at its downward end and having an elongated, irregular but roughly cylindrical shaped cut out extending along a major portion of the pressure applying member. Finger access cut outs centrally disposed in the cylindrical member provide means for inserting and/or removing a demountable, throwaway $CO_2$ pressure capsule, caplet or Powerlet ®. The capsule used is readily available and mass produced for use with pellet rifles or pistols. A threaded screw fed activator member, including a wing nut, for hand actuation, is mounted in the distal end of the angled cylindrical member and includes a capsule engaging end projecting into the hollow interior of the cylindrical member. The interior end of the angled cylindrical member is provided with a capsule piercing or puncturing member connecting the end of the capsule with an inlet aperture or opening which opening extends into the interior of the cylindrical testing chamber.

The upper wall of the testing chamber is provided with an inlet/outlet, pressure relief or escape valve for releasing air pressure during or after the testing operation is completed.

A modified version of the present invention provides a means for applying air under pressure to the testing chamber by way of a top mounted self contained structure. A pressure capsule or caplet holding member is integrally molded into the top lid or cap of the two piece assembly earlier described. A substantially identical structural arrangement to that of the downwardly angled pressure introducing member is disposed in the lid or cap. This latter arrangement provides a simple, yet efficient two part assembly which is relatively simple to mold and easy to manipulate and operate for an unskilled operator. Still another version can have a completely separate hand filler design which eliminates either filler assembly on the testing chamber rendering the apparatus even less cumbersome with more portability and object visibility during testing.

DESCRIPTION OF THE PREFERRED EMBODIMENT

Figure 1:
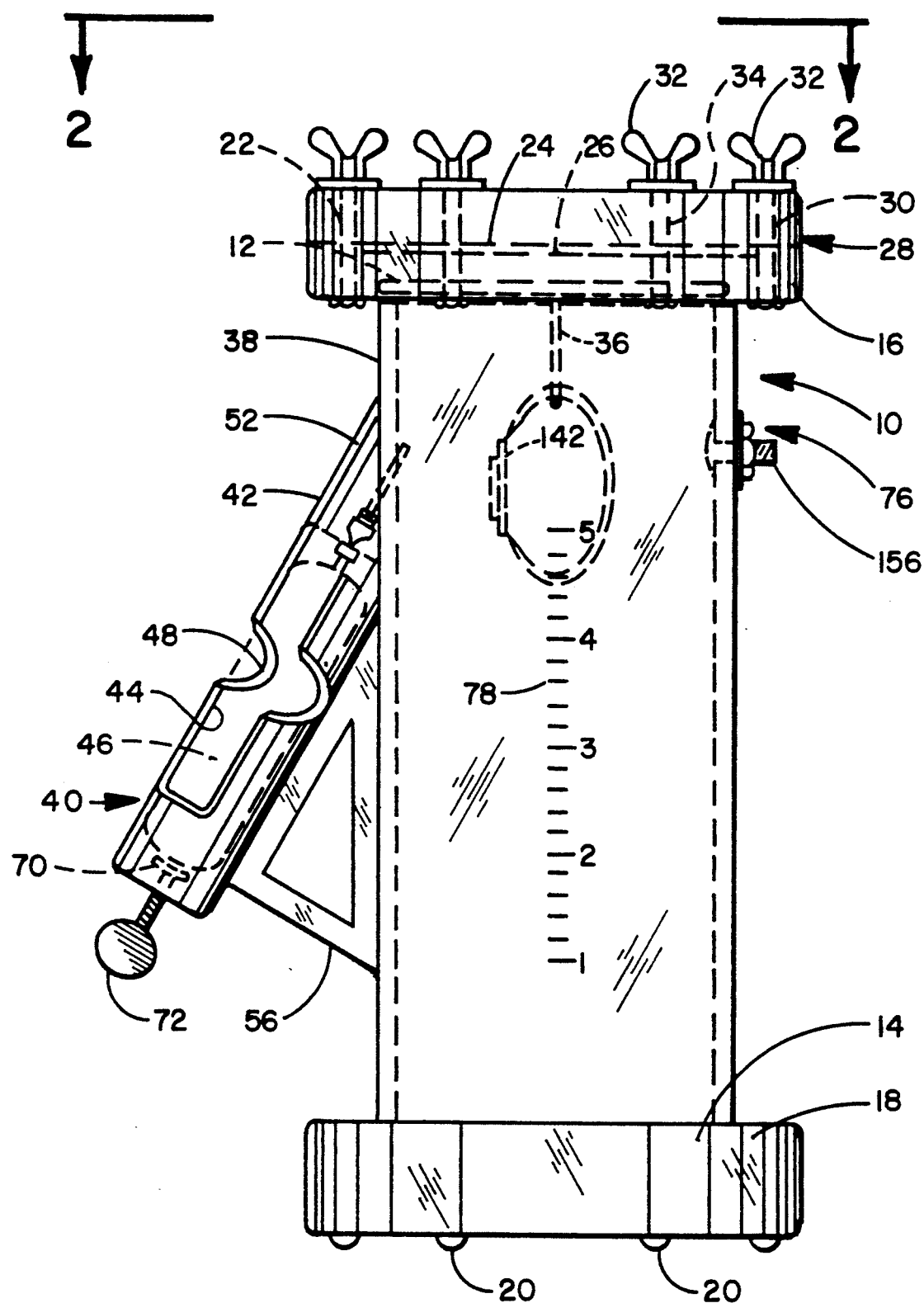
FIG. 1 is a side elevational view of apparatus embodying the present invention.
Figure 2:
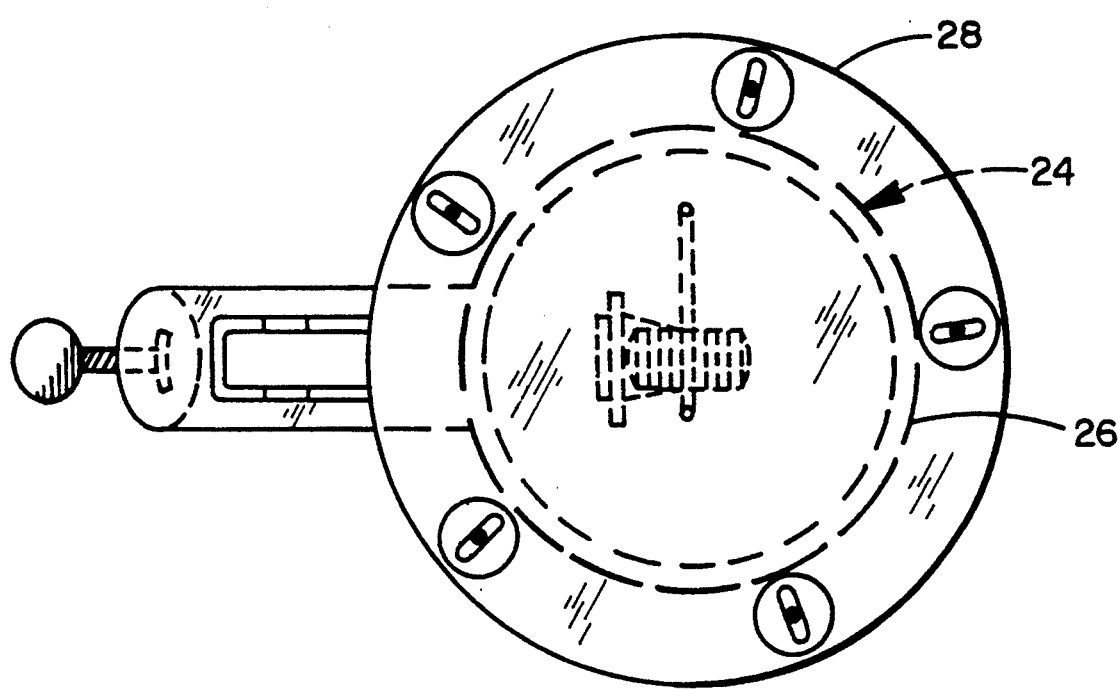
FIG. 2 is a top plan view along the line 2—2 of FIG. 1.
Figure 3:
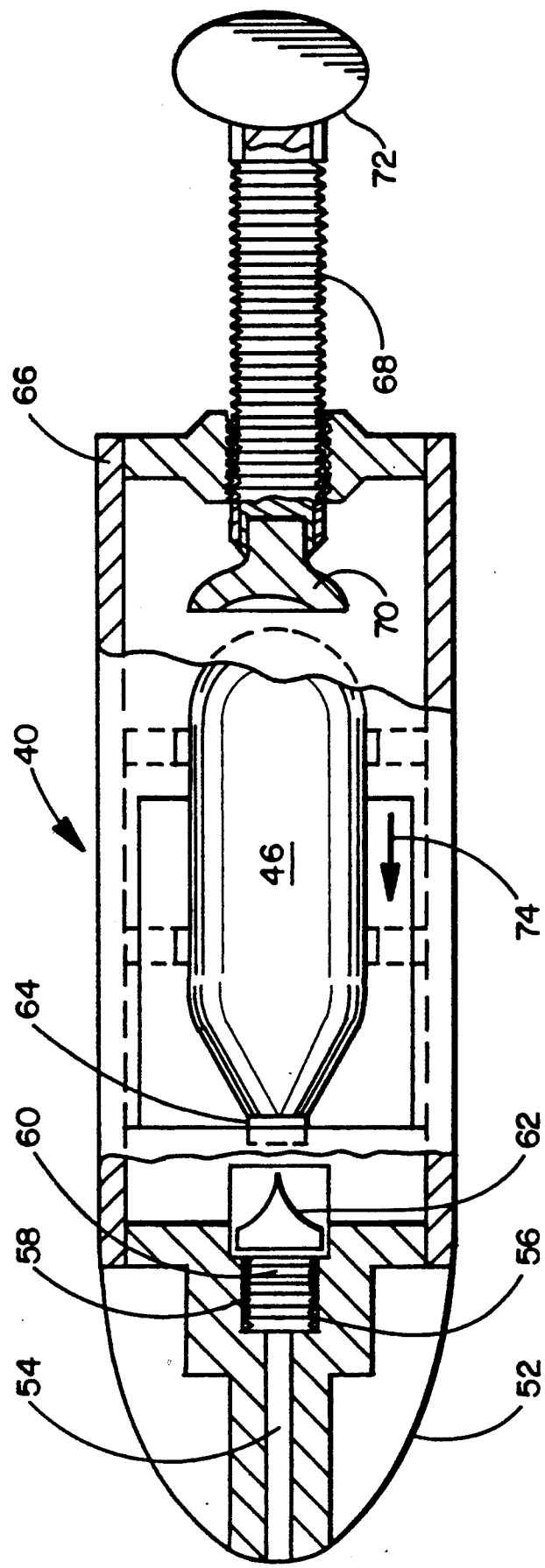
FIG. 3 is an enlarged, sectional view of the pressure filler member of one form of pressure testing apparatus embodying the present invention.

The present invention is embodied in apparatus illustrated in FIGS. 1 through 6 inclusive, as will now be described. A non invasive, timepiece testing apparatus embodying the present invention is seen in FIG. 1 to comprise a test chamber in the form of a cylindrical member 10 having an open top end 12 and an integral bottom end 14. The test chamber 10 is molded from a clear, acrylic plastic with an integral, formed solid bottom. Both the top 12 and bottom 14 include an integrally formed (molded) upper or top lip or rim 16 and a lower or bottom rim 18, respectively. The bottom lip or rim 18 is provided with a plurality of short integral standoffs or feet 20 providing means for positioning the member 10 in an upright vertical orientation while permitting ease of handling in moving the test chamber 10 from one place to another. Also, the standoffs 20 avoid scratching the transparent bottom during movement. The upper lip or rim 16 includes a circular, spaced ring of attachment holes 22. A shallow groove or channel 24 FIG. 2 is formed in the surface of the lip or rim 16 in order to receive a circular, one piece sealing gasket or O-ring 26. A lid or cover member 28, also of molded or formed acrylic plastic, is provided with a circular ring of attachment holes 30. The holes 30, FIG. 3, are circularly spaced for mating orientation with the ring of holes 22 in the rim or lip 16 of the chamber 10. A plurality of wing nuts 32, washers 33 and bolts 34 are used to hand tighten the lid or cover 28 onto the top 12 of the cylindrical chamber 10. Secured to the inner surface of the lid or cover 28 is a support hanger 36 which may be curved or shaped to enable mounting and dismounting of a timepiece to be tested in the chamber 10.

Molded integrally into the side wall 38 of the cylindrical chamber 10 is a pressure applicator filler member 40. The filler member 40 is formed as an elongated, cigar shaped cylinder 42 provided with a rectangular cut out 44 for ingress and egress of a pressure supplying $CO_2$ cartridge, caplet or Powerlet ® 46. Oppositely disposed, circular, finger cutouts 48 enable hand insertion and removal of the pressure cartridge 46. An angularly shaped gusset 56 secures the distal end of the pressure applicator 40 to the side wall 38 as well as providing support for the lower end of the member 40 during insertion and removal of the $CO_2$ cartridge 46.

As seen most clearly in FIG. 3, the interior of the chamber engaging upper end 52 of the member 40 includes a small, internal passageway 54 extending from the enlarged bore 56 upwardly into the interior of the test chamber 10, FIG. 1. The bore 56 is threaded as at 58, FIG. 3, so as to receive a threaded cartridge puncturing member 60, which is tightly threaded into the bore 56. The member 60 is provided with a sharpened end 62, which may be formed as a rigid, hollow needle-like element for puncturing reception within the nose cone 64 of a $CO_2$ cartridge 46, shown in dotted outline in FIG. 1, but in full line in FIG. 3. The opposite, (leftward) distal end 66 of member 40 includes a threaded short rod 68 extending upwardly (leftwardly in FIG. 3) into the interior of the lower end 66 and provided with a small cup shaped member 70 engagable with the rounded end of the $CO_2$ cartridge 46 when the cartridge is positioned within the member 40. With a $CO_2$ cartridge 46 disposed within the member 40, clockwise rotation of the wing nut 72 on the outward end of rod 68 forces the cartridge 46 bodily forward in the direction of the arrow 74, causing the sharpened end 62 to penetrate and puncture the nose cone 64, expelling the $CO_2$ contents into and through the passageway 54 and into the interior of the test chamber 10 pressurizing the latter to the desired test pressure.

Secured to and extending into and through the wall 38 of the chamber 10 is a spring biased air pressure valve 76 FIG. 1. The valve 76 is physically located at approximately the same elevation as the upper end 52 of the member 40, as will become clear shortly. The valve 76 is of the well known inner tube type as used with automobile and bicycle tires and can be used for introducing air under pressure or for releasing pressurized air.

Figure 4:
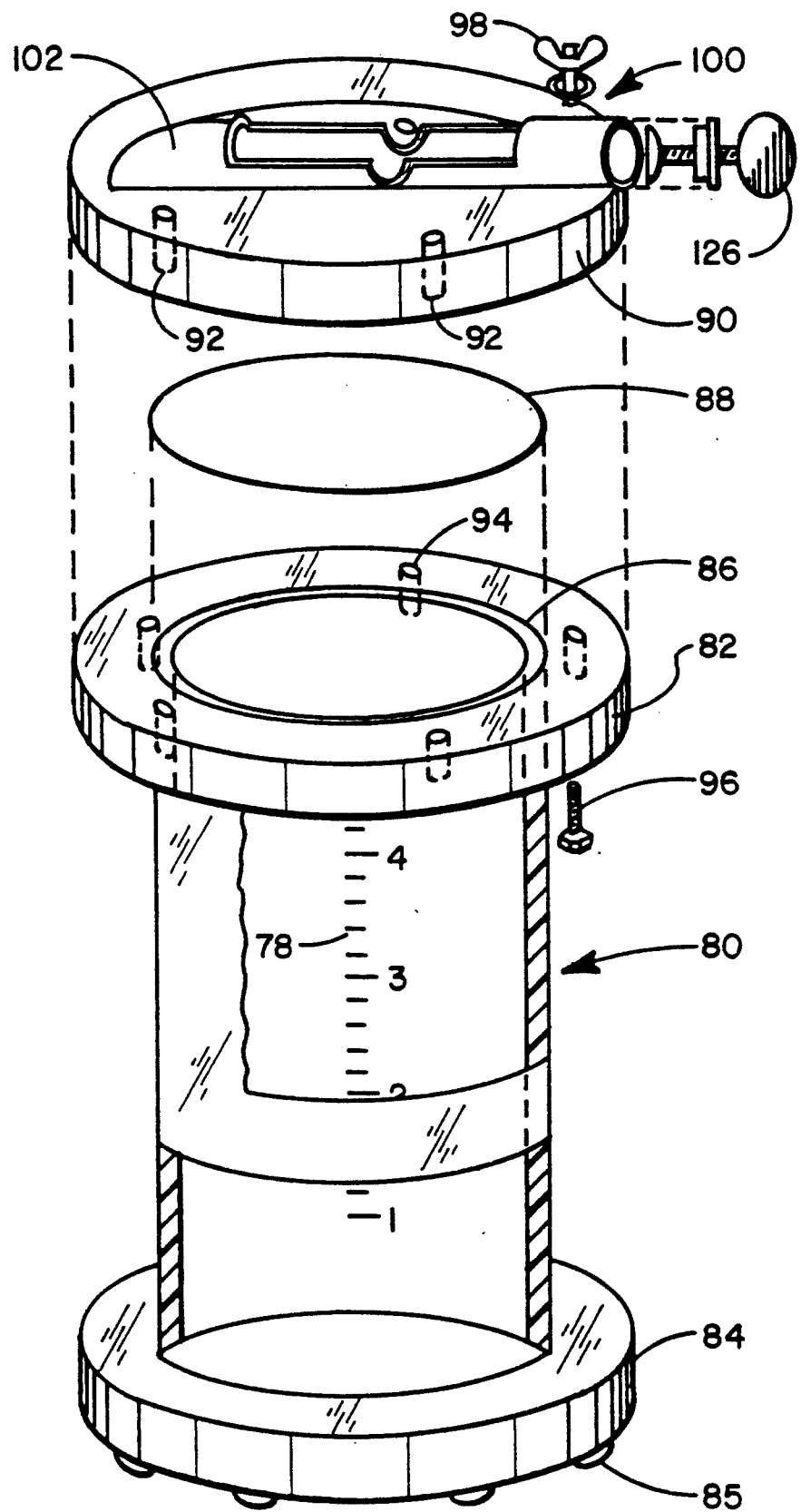
FIG. 4 is a side elevational view of a slightly modified non-invasive testing apparatus embodying the invention.
Figure 5:
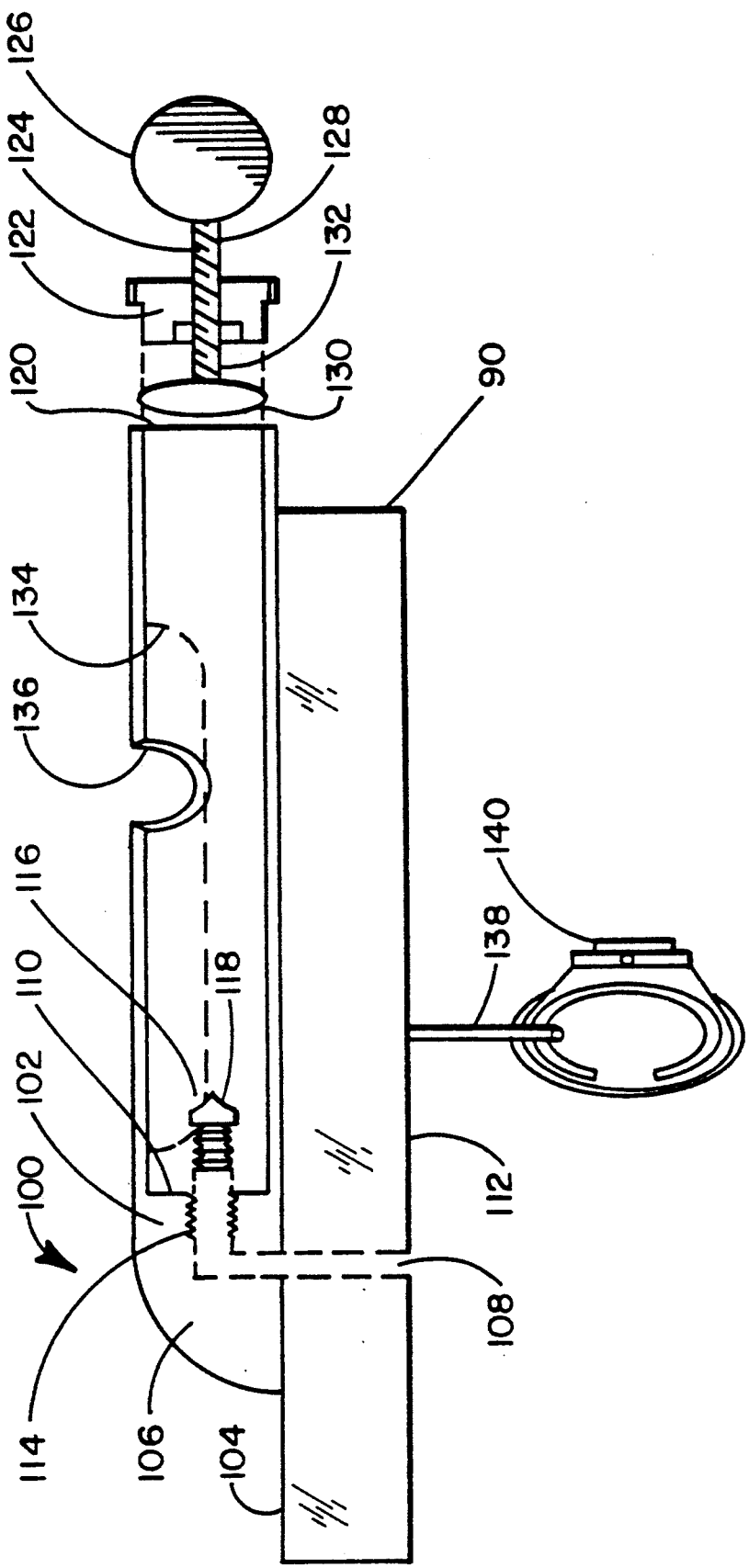
FIG. 5 is a detailed view of the pressure filler member for a modified form of non invasive testing apparatus embodying the present invention.

The external periphery of the member 10 FIG. 1 and 80 FIG. 4 is provided with easily, visually recognizable series of numbered graduations 78, from 1-5, for indicating to the operator/observer the water content volume of the member 10. This aids in desired variances in internal psi by water level adjustment, e.g. level 5 creates a much smaller inner air space, thus creating more psi when a Powerlet ® is released than would level 2.

FIG. 4 illustrates a modified pressure testing apparatus embodying the present invention. The cylindrical transparent testing chamber 80 is shown as an externally smooth chamber formed, as by molding processes, to include integral top and bottom exterior rims or lips 82 and 84, respectively. The bottom rim 84 is provided with a plurality of rigid short standoffs or feet 85 to enable the testing chamber 80 to be positioned in an upright vertical position.

The upper integral rim or lip 82 includes a shallow groove 86 into which a resilient O-ring or sealing gasket 88 is disposed. A rigid, circular cover 90 having the same external diameter as the top rim 82 is arranged to be received over the top rim 82. The cover member 90 of transparent acrylic plastic is provided with five through bolt holes 92 for mating alignment with five through bolt holes 94 in the top rim 82. Bolts 96 are passed through the aligned holes 92 and 94 and are engaged by wing nuts 98 so as to secure the cover to the top of the test chamber 80.

The top cover 90, as shown in FIG. 4, is molded, cast or otherwise formed so as to incorporate into the cover member 90 a pressure applicator filler member 100 (shown in detail in FIG. 5) as an integral part of this member 90. An elongated, substantially cylindrical body member 102 is integrally formed with the cover member 90 and extends across the exposed upper surface 104 of the cover 90. The inboard closed end 106 of the member 102 is curved so as to terminate flush with the surface 104. A passageway 108 extends from the inner end 110 of 106 into and through the curved end 106 to open out into the internal surface 112 of the cover 90. The inner end 110 includes a threaded bore 114 into which a cartridge puncturing member 116 is threadedly received. A rigid, hollow needle-like member 118 extends outwardly from the member 116 for engagement with the nose cone FIG. 3 64, of a $CO_2$ cartridge 46 FIG. 5. The open end 120 of the filler member 100 has a welded or press fit circular plug 122 secured thereto. A short threaded shaft 124 is threaded into the plug 122 and carries a wing nut 126 at its outer end 128 and a cup shaped $CO_2$ cartridge engaging member 130 at the inboard end 132 thereof.

An enlarged rectangular access opening 134 is cut or otherwise formed in the filler member 100, each side of which includes a finger access opening 136. The openings 134 and 136 permit mounting and dismounting of $CO_2$ cartridges 46 as the need arises. Mounting means 138, secured to the cover 90 enables the operator to mount and dismount the test object 140 easily and quickly.

Figure 6:
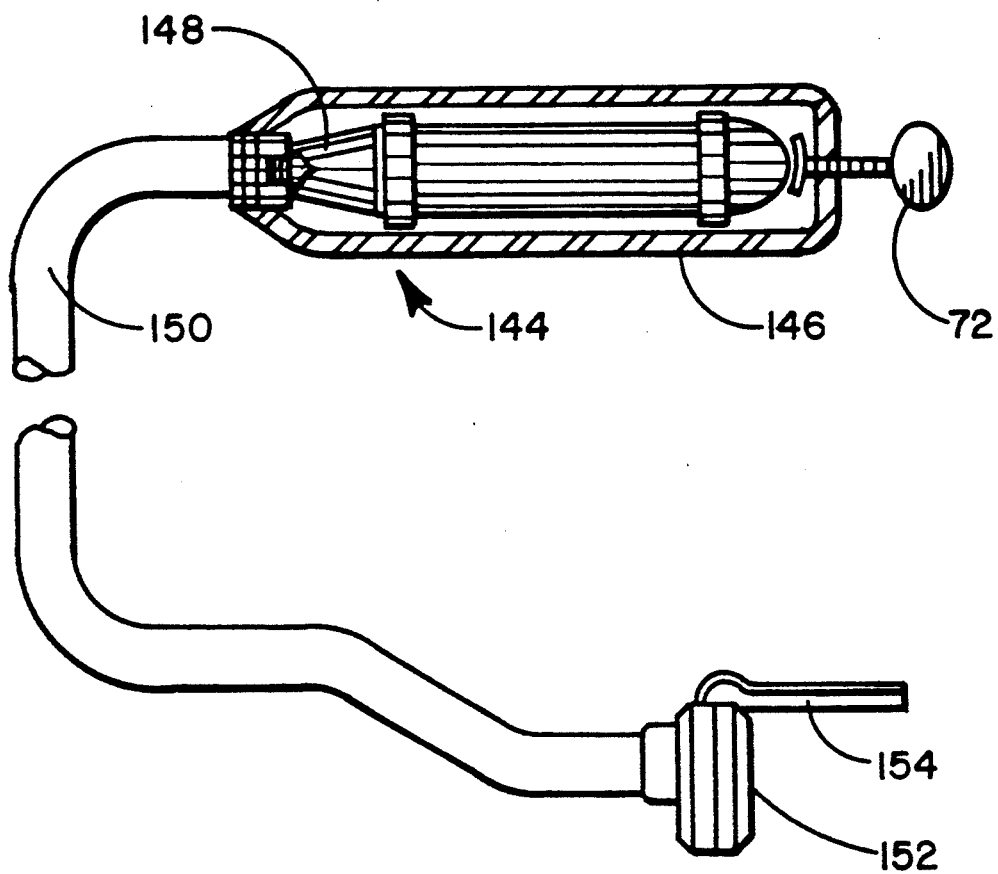
FIG. 6 is a detail view of a portable, hand carried pressure filler member for use with the test chamber.

A hand held, transportable, air pressure filler applicator 144 is illustrated in FIG. 6. The $CO_2$ cartridge receiving member 146 is substantially identical in construction and operation to the member 40 seen in FIG. 3. The air pressure outlet end 148 of member 146 is secured to one end of a flexible hose member 150. The opposite end of hose member 150 is provided with a tire type valve attachment member 152, including a hand actuated rockable, securing/releasing lever 154. The member 152 is receivable over the outwardly extending, spring biased valve stem insert 156, FIG. 1 and is locked in place by means of the rockable lever 154. Where it is necessary or desirable the hand held filler applicator 144 may be used instead of the angle oriented filler applicator member 40, FIG. 1 or the top mount assembly member 100 FIG. 5.

TEST OPERATION

The test operator first fills one of the test chambers 10 or 80, to the water level for pressure desired. Level 3½ has been used during experimentation and consistently achieves 110 psi atmosphere. The object to be tested, for example, a SCUBA diver's wrist watch 142 FIG. 1, is secured to the mounting cuff or bracket 36. The holes 30 of the cover 28 are aligned with the holes 22 of the testing chamber 10 such that the watch is positioned opposite the pressure release valve 76. The cover 28 is tightened over the O-ring 26 by means of the wing nuts 32 so as to seal the chamber 10 airtight.

As noted on the chart (Table 1) set forth hereinafter below, as a diver descends under the water, for example, for every 33 feet of depth, the sea level pressure of 14.7 psi (pounds per square inch) increases by 1 atmosphere or 14.7 psi. Thus, at 99 feet the pressure on the diver's body is 58.8 psi and at a depth of approximately 200 feet (198 feet exactly) the pressure is 102.9 psi. The diver's body motion also tends to increase the external pressure by some slight but calculable amount.

TABLE 1

| Sea Level | = | 14.7 pounds per square inch (psi) |
|---|---|---|
| 33 feet | = | 29.4 psi |
| 66 feet | = | 44.1 psi |
| 99 feet | = | 58.8 psi |
| 132 feet | = | 73.5 psi |
| 165 feet | = | 88.2 psi |
| 198 feet | = | 102.9 psi |
| 231 feet | = | 117.6 psi |

Each diver must provide means for indicating the time spent under water. Particularly, the time spent at any considerable depth or on ascent to the surface the diver risks painful "bends" or even death. As noted in the Jeppesen, Sport Diver Manual, 3rd edition, a training manual for the beginning and more advanced diver. Sec. D. selecting a diving watch sec 1, page 71 "Not all water-resistant or waterproof watches can withstand increased underwater pressure. A diving watch should be labeled and pressure tested to at least 220 feet (660 feet preferred)". Sec. 2, page 45 "The U.S. Navy has set up a "No Decompression Limits" table listing the number of minutes you can theoretically stay at certain maximum depths and still avoid decompression sickness," "the bends". For example, at 35 feet, you must return to the surface before 310 minutes have passed to avoid stage decompression. At 60 feet, your no-decompression limit is 60 minutes".

SCUBA divers' timepieces are precise and accurate as can be manufactured. Each timepiece is tested at the time of manufacture for "water tightness" at a specific maximum pressure/depth. However, continued use and wear over long periods of time, battery changes and/or repair often weakens or voids the watch case seal. In time the watch will leak, terminating its use in or under water. In order to ensure the diver's safety by means of accurate time keeping, the present invention provides a non-invasive, portable, accurate and easy to use testing apparatus. Little or no skill is required other than a quick, visual check for air bubbles.

A $CO_2$ cartridge 46 is inserted into the filler member 40 with the cartridge nose cone 64 pointed or angled upwardly within the filler member 40. The wing nut 72 is rotated to force the cup shaped member 70 upwardly causing the $CO_2$ cartridge to move. The nose cone 64 is punctured by the needle 60 forcing air under the desired pressure into the test chamber 10. A pressure of 110 pounds per square inch (equivalent to a depth of over 200 feet as indicated on the accompanying pressure-depth chart) is normally used. The pressure may of course be tested with an air pressure gauge by valve 156 FIG. 1 but ordinarily the $CO_2$ cartridge 46 in use is calibrated at a fixed, accurately calibrated, invariant pressure. The watch is retained in the pressurized atmosphere for approximately 5 minutes. Theory, if the watch case is not air tight to the specific air pressure, it will equalize to the pressure inside the test chamber 10, for example, 110 pounds per square inch leaks inside the case of the watch because it is exposed to that pressure atmosphere in the end of the test cylinder. As the watch is submerged during the pressure release and if there were a leak, air bubbles will form and rise off the watch case due to lack of seal as a result of decreasing pressure inside the test chamber and inside the watch now under water. At the end of this elapsed time (5 minutes), the inside pressure in the test chamber is first released by counter clockwise rotation of wing nut 72 or 126. The test chamber 10 is simultaneously moved from the vertical position to the horizontal position.

At the first sign of bubbles, the chamber is immediately returned to the upright, vertical position, the pressure is still continually being released to prevent any liquid infiltration and the watch is removed from the chamber 10 for repair or resealing. Thus, the operator can locate and correct the leak (if any), then retest the timepiece without the introduction of water or other fluids into the case of the timepiece.

The operation of the modified apparatus of FIG. 4 is substantially identical to the operation of the apparatus of FIG. 1. Due to the position change of the filler member 100, no air pressure release valve is necessary or required. Release of the air pressure is automatically accomplished via the puncturing needle 118 when the $CO_2$ cartridge 46 is released or withdrawn from engagement with the needle 118.

There has thus been described a new, novel and unobvious pressure testing apparatus which is inexpensive, easily handled when moved from place to place due to its small size and physical construction. The device is operable by fairly unskilled individuals and without danger of explosion or leakage of liquid into the watch.

What is claimed is:

1. Non-invasive, portable, modular testing apparatus for non-invasively testing timepieces for fluid integrity without damaging or dismantling the timepiece and without interrupting the timekeeping function or operation thereof, comprising:

a transparent tubular container member capable of providing a high pressure, fluid sealed environment for said timepiece, said container member being open at one end and provided with an enlarged, integral rim portion, a plurality of equidistantly spaced apertures disposed around said rim portion, the opposite integral end of said tubular container member including an enlarged integral rim portion equal in diameter to the rim portion of said open end providing a rigid, non rockable base for said container, a circular, rigid, transparent closure member for said container having equidistantly spaced apertures alignable with the apertures in the rim portion of said open end, attachment means receivable in said apertures, for securing said closure member to said tubular container member, means interposed between said closure member and said tubular container member for sealing said container member from the ambient atmosphere, and pressure applicator means integral with said tubular container member, including means for mounting and dismounting pressure producing means so as to automatically pressurize the internal volume of said tubular container member.

2. The invention in accordance with claim 1 wherein said pressure applicator means includes means for accepting and activating a pressure producing canister/capsule and pressure relief valve means.

3. The invention in accordance with claim 1 wherein said opposite integral end of said container includes a plurality of pedestal members providing means supporting said container in a vertical orientation.

4. The invention in accordance with claim 1 wherein said pressure applicator means is arranged externally of said container member and integral with a side wall of said container.

5. The invention in accordance with claim 4 wherein said pressure applicator means is acutely angled downwardly facilitating the insertion therein of a pressure producing capsule.

6. The invention in accordance with claim 1 wherein said circular rigid closure member includes a pressure applicator means and wherein said tubular container member comprises a continuous, smooth sided, unbroken surface from open top to integral bottom.

7. The invention in accordance with claim 6 wherein said pressure applicator means is integral with one surface of said circular closure member and includes integral passageway means for applying pressure to said tubular container when said circular closure member is in sealing engagement with said container.

8. The invention in accordance with claim 1 wherein said container further includes volumetric designations of the fluid content volume of said container for visually indicating the desired fluid level relative to the depth and pressure for which the timepiece is to be tested.

9. The invention in accordance with claim 1 wherein said container is provided with valve means operable to introduce pressure into or release pressure from said container.

10. Pressure applicator means for use with non-invasive, modular timepiece testing apparatus, including valve means operable to introduce pressure into or release pressure from a pressurized container, wherein said pressure applicator means is provided with pressure capsule receiving means and flexible means for attachably mounting and dismounting said pressure applicator means to said valve means for pressurizing said container.

11. The invention in accordance with claim 10 wherein said means for attachably mounting and dismounting said pressure applicator means further includes oppositely disposed, finger accepting openings permitting ease of ingress and egress for said pressure producing capsule.

* * * * *